(12) United States Patent
Prell et al.

(10) Patent No.: US 7,134,508 B2
(45) Date of Patent: Nov. 14, 2006

(54) ROTARY TO RECIPROCATING MOTION CONVERSION ATTACHMENT FOR A POWER ROTARY HAND TOOL

(75) Inventors: Edward T. Prell, Chicago, IL (US); Charles Hulsey, Naperville, IL (US); Josh A. Davis, Wheeling, IL (US); Edward J. Rohr, Jr., Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/844,467

(22) Filed: May 12, 2004

(65) Prior Publication Data

US 2005/0252670 A1   Nov. 17, 2005

(51) Int. Cl.
*B25D 9/00* (2006.01)
(52) U.S. Cl. .................. 173/29; 173/205; 173/132; 173/122
(58) Field of Classification Search ............... 173/170, 173/205, 29, 122, 171, 132; 433/118, 122; 74/55, 56, 57; 30/122, 392
See application file for complete search history.

(56) References Cited

U.S. PATENT DOCUMENTS

| | | | |
|---|---|---|---|
| 1,588,832 A | | 6/1926 | Young |
| 1,871,020 A | * | 8/1932 | Wyzenbeek .................. 74/57 |
| 2,816,583 A | | 12/1957 | Hill |
| 3,260,289 A | | 7/1966 | Whitten, Jr. |
| 3,449,967 A | | 6/1969 | Dancsik |
| 4,712,625 A | * | 12/1987 | Kress .................... 173/104 |
| 4,901,588 A | * | 2/1990 | Zudal ...................... 74/57 |
| 5,427,188 A | * | 6/1995 | Fisher ..................... 173/205 |
| 5,511,912 A | | 4/1996 | Ellerbrock |
| 5,607,265 A | | 3/1997 | Lane et al. |
| 6,012,346 A | | 1/2000 | Vo |
| 6,021,573 A | * | 2/2000 | Kikuchi et al. .............. 30/392 |
| 6,176,322 B1 | | 1/2001 | Wadge |
| 2003/0047039 A1 | | 3/2003 | Jones |
| 2004/0035595 A1 | * | 2/2004 | Fisher ..................... 173/205 |

OTHER PUBLICATIONS

McCulloch SL501 4 in 1 Multi tool catalog. http://www.flexcut.com/tools/accessories/sl501.html.

* cited by examiner

*Primary Examiner*—Rinaldi I. Rada
*Assistant Examiner*—Brian Nash
(74) *Attorney, Agent, or Firm*—Greer, Burns & Crain, Ltd.

(57) ABSTRACT

A preferred embodiment of a rotary tool reciprocating motion conversion attachment for a rotary power hand tool is described which is configured to be attached to a nose portion of the hand tool housing. The attachment has a rotary drive train in a housing that is connectable to the output shaft of the hand tool, the drive train driving a barrel cam having an exterior cam groove. A cam follower rides in the cam groove and produces reciprocating motion, with the cam follower being part of a cam follower assembly to which an implement holder is attached. The preferred embodiment has a cam groove configuration which causes the implement holder to move slower during a cutting stroke and faster during a return stroke, thereby tending to optimize the operation of the cutting implement. The preferred embodiment also includes a planetary gear set for reducing the rotational speed of the hand tool output shaft to reduce the speed of reciprocation of the attachment.

19 Claims, 9 Drawing Sheets

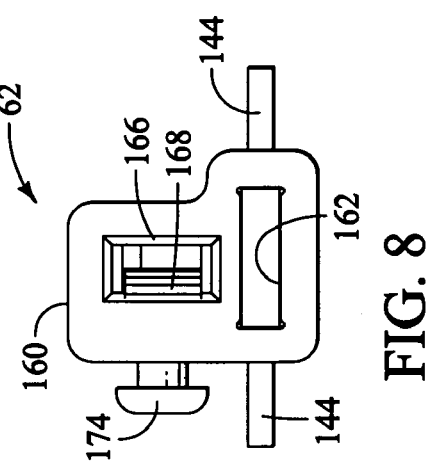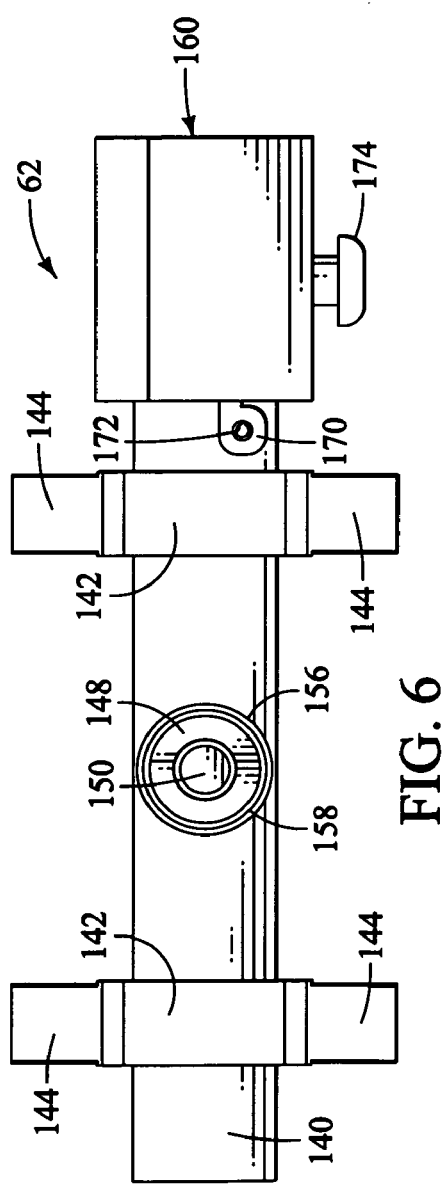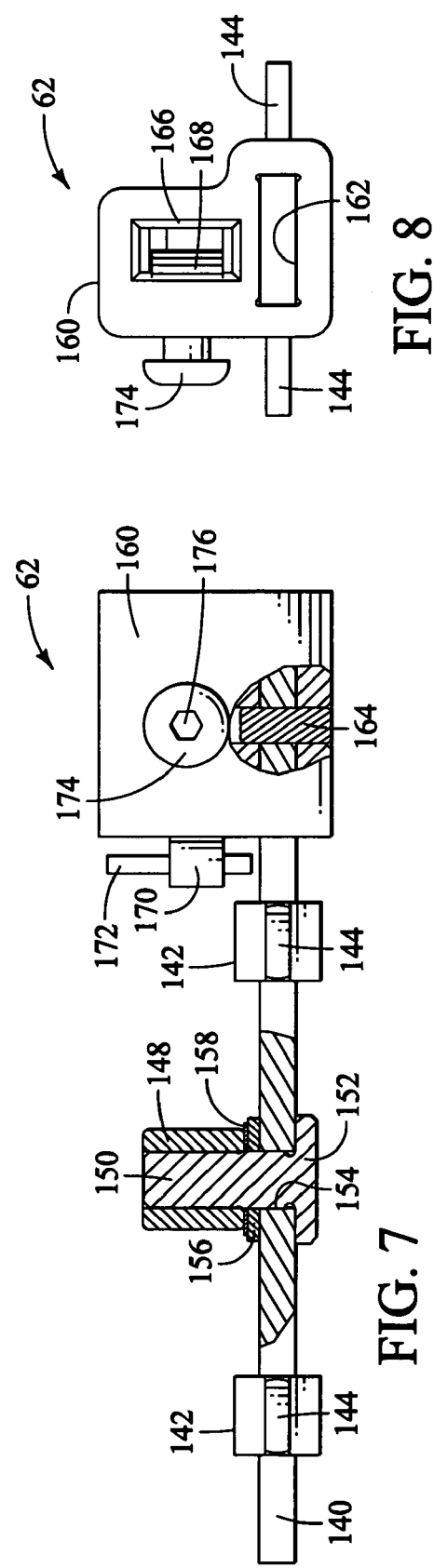

ROTARY TO RECIPROCATING MOTION CONVERSION ATTACHMENT FOR A POWER ROTARY HAND TOOL

BACKGROUND OF THE INVENTION

The present invention generally relates to power hand tools and more particularly to a rotary to reciprocating motion conversion attachment for the same.

Small rotary hand tools have been marketed for many years for use in carrying out woodworking and metal working tasks by hobbyists as well as commercial artisans. Such small rotary hand tools generally have a motor unit with a rotary output shaft that is adapted to be connected to a number of implements for doing such application work as grinding, polishing, drilling and sanding, among other tasks. Such hand tools are also configured to operate with accessories, such as, for example, a long sheathed cable to which a sanding implement or rotary cutting implement can be attached, a planing attachment as well as a right angle attachment that facilitates use of implements in special applications.

The drive unit of many recent models of such rotary hand tools is relatively small and lightweight and is capable of being easily used by a user. Such rotary hand tools may have a diameter less than about two inches and a length of only about six inches. The tool has a small but powerful electric motor that drives an output shaft at high speed and a rotary implement can be typically attached to the tool's output shaft which is axially aligned with the generally cylindrical hand tool.

While most of the applications that have been discussed above are directed to applications where rotary implements are used in various ways, there are other desirable uses for such rotary hand tools if an accessory were to be attached to the hand tool that would convert the rotary motion into reciprocating motion so that cutting, sawing sanding, filing, buffing and polishing implements that reciprocate could be used. Mechanisms which convert rotary motion to reciprocating motion are known in the art, but many have one or more disadvantages in that they may not provide a sufficiently large reciprocating stroke to be efficient and effective, or they may not be sufficiently robust to have a long useful life or exhibit sufficient cutting or sawing force during operation. The mechanisms for producing a reciprocating action for a saw blade or the like generally produce a sinusoidal movement in that the duration of a stroke in one direction is equal to the duration of the stroke in the reverse direction.

For many saw blades, such as commercially available saber saw blades, the actual cutting action that is made by the blade is in a particular direction, i.e., the cutting stroke and the other movement is a return stroke which to returns the blade to the position where the next cutting stroke begins. Since the cutting action only occurs during one-half of the total length of movement of the blade, cutting action may be optimized by having the cutting stroke be of longer duration than the return stroke. This asymmetrical timing of the two strokes does not exist in known prior art rotary to reciprocating motion conversion apparatus.

SUMMARY OF THE INVENTION

A preferred embodiment of a rotary tool reciprocating motion conversion attachment for a rotary power hand tool is described which is configured to be attached to a nose portion of the hand tool housing. The attachment has a rotary drive train in a housing that is connectable to the output shaft of the hand tool, the drive train driving a barrel cam having an exterior cam groove. A cam follower rides in the cam groove and produces reciprocating motion, with the cam follower being part of a cam follower assembly to which an implement holder is attached. The preferred embodiment has a cam groove configuration which causes the implement holder to move slower during a cutting stroke and faster during a return stroke, thereby tending to optimize the operation of the implement. The preferred embodiment also includes a planetary gear set for reducing the rotational speed of the hand tool output shaft to reduce the speed of reciprocation of the attachment.

DESCRIPTION OF THE DRAWINGS

FIG. 6 is a top plan view of the cam follower assembly of the apparatus shown in FIG. 1;

FIG. 7 is a side view, partially in section, of the cam follower assembly shown in FIG. 6;

FIG. 8 is a front view of the cam follower assembly shown in FIG. 6;

DESCRIPTION OF THE PREFERRED EMBODIMENTS

Figure 1:
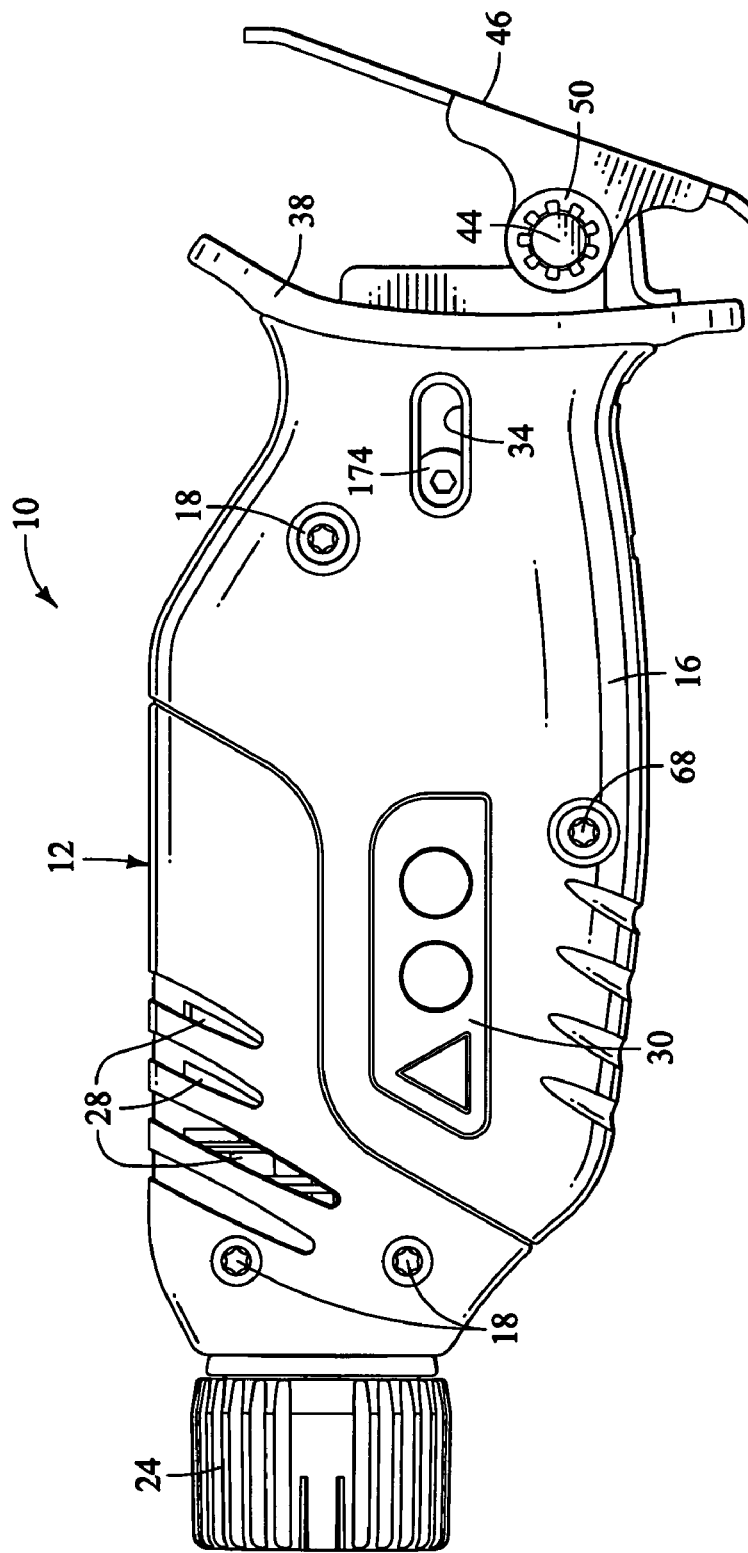
FIG. 1 is a side view of a preferred embodiment of the rotary to reciprocating motion conversion attachment embodying the present invention.
Figure 2:
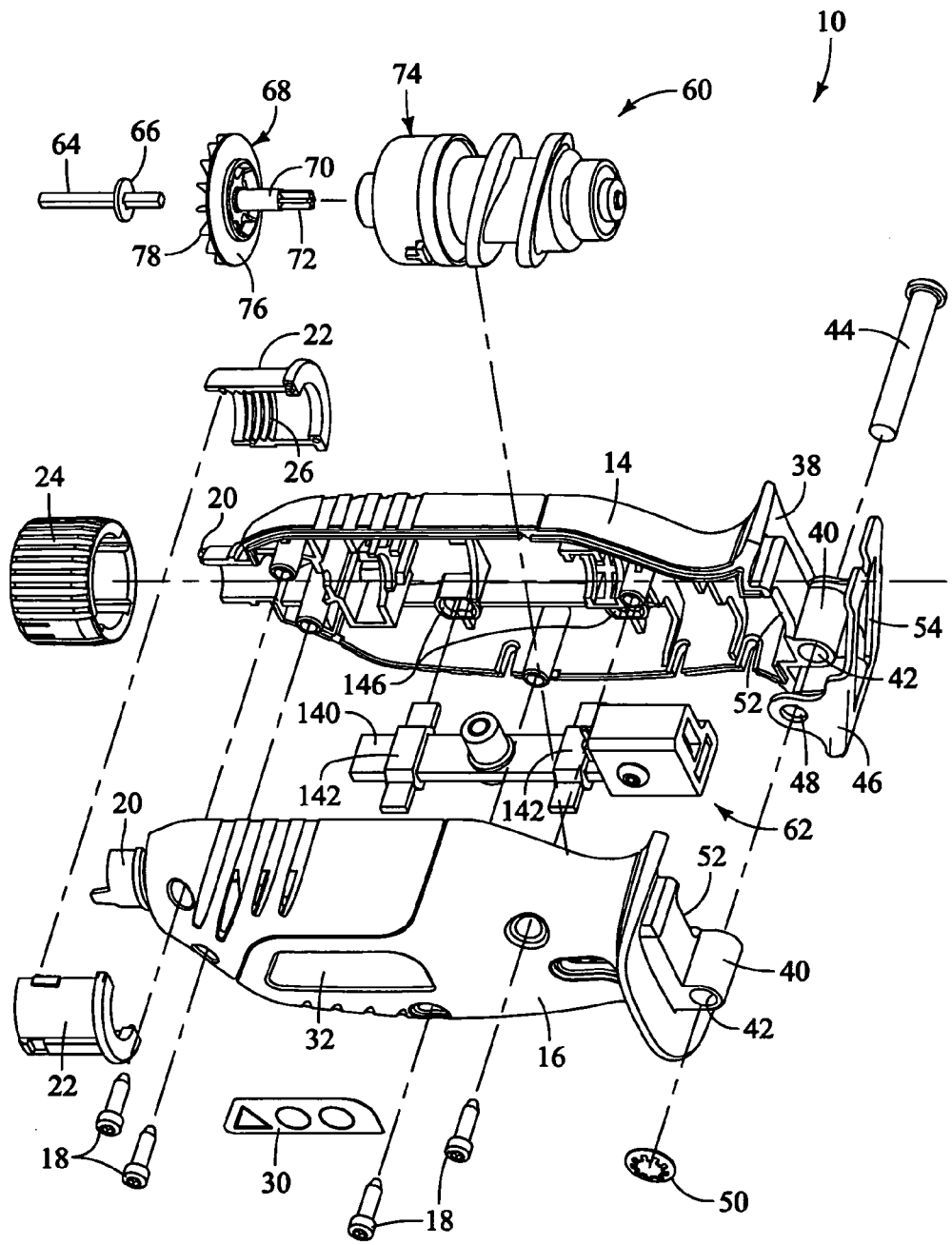
FIG. 2 is an exploded perspective view of the attachment shown in FIG. 1.
Figure 3:
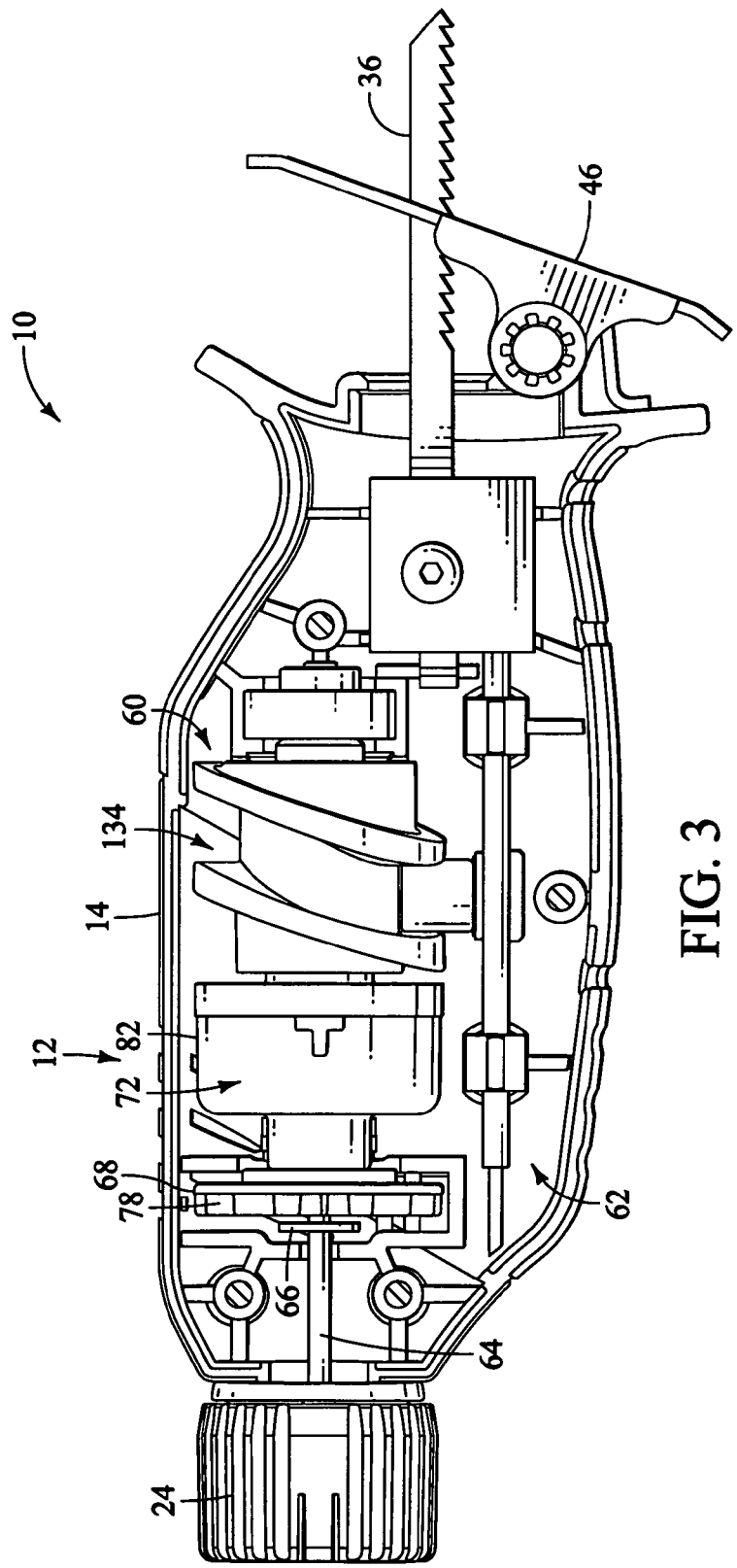
FIG. 3 is a side view of the attachment shown in FIG. 1, with a portion of the housing removed to show the internal components thereof, and also illustrating a representing blade implement that may be driven by the attachment.

Turning now to the drawings, the attachment indicated generally at 10, is shown as a whole in FIGS. 1–3, with the remainder of the drawings illustrating various parts of the internal structure of the attachment. The attachment 10 is configured to be mounted on the nose portion of a high speed rotary power hand tool that is not shown in the drawings, but which is generally cylindrical in shape and has a smaller nose portion from which an output shaft extends, with the output shaft having a threaded end portion on which a chuck may be screwed on. Alternatively, a cap with an opening at the end thereof may be screwed on the shaft, with the opening being square or some other noncircular shape so that a drive coupling shaft can couple the output shaft of the hand tool to the attachment of the present invention. While not illustrated, the above described construction is known to those of ordinary skill in the art and is also disclosed in detail in U.S. Pat. No. 6,463,824 entitled Right Angle Attachment for Power Hand Tool, which is assigned to same assignee as the present invention. This patent is specifically incorporated by reference herein.

The attachment 10 has a housing, indicated generally at 12, that is comprised of two mating sections 14 and 16 with the two sections being complementary and connected together by a number of screws 18. The housing sections are preferably made of a plastic or plastic-like material, such as ABS or glass filled nylon. Each of the housing sections 14 and 16 has a semi-cylindrical mounting portion 20 which when the sections 14 and 16 are fit together, define a generally cylindrical configuration over which have two semi-cylindrical overflow nut pieces 22 may be placed, and which are rotatable relative to the housing 12. A sleeve 24 is configured to snap-fit onto the coupled nut pieces 22 enabling interior threads 26 thereof to engage the outer threads of the nose portion of the rotary hand tool to which the attachment 10 is to be mounted. The sleeve 24 interconnects the overflow nut pieces 22 so that the entire structure rotates on the mounting portions 20 for screwing the attachment onto the hand tool.

The housing 12 has a number of vent openings 28 in each section 14 and 16 thereof for admitting and exhausting air from the interior of the housing 12 during operation. The housing also has a warning insert 30 that fits within a recess 32 of the housing section 16 which also has an elongated opening 34 which permits access to the interior of the housing for manipulating a set screw for securing or removing an implement such as a saw blade 36 as shown in FIG. 3. The housing has a generally transverse front portion 38 that is slightly curved as shown and which has a raised transverse generally cylindrical portion 40 formed at the front of each section 14, 16 of the housing which has an opening 42 through which a pivot stud 44 passes for mounting a guide foot 46 to the housing 12.

The pivot stud 44 also passes through openings 48 on opposite sides of the guide foot 46. The guide foot is pivotal around the pivot stud 44 and the pivot stud 44 is locked in place by an inner toothed retainer 50. Each of the housing sections 14 and 16 also has a cut out 52 which define a single opening for the blade 36 to pass. Similarly, the guide foot 46 has an opening 54 through which the blade can extend.

With regard to the internal components of the preferred embodiment, the attachment 10 has a rotary drive train, indicated generally at 60, and a cam follower assembly, indicated generally at 62. As shown in FIG. 2, the drive train 60 includes a drive coupling shaft 64 that has an annular outwardly extending flange 66 for limiting axial movement of the coupling shaft relative to a fan blade 68 that is mounted to a pinion shaft 70 that has a pinion gear 72 at its rightward end portion for engaging a planetary gear set 74. The fan 68 has a flat circular plate portion 76 to which a number of fan blades 78 are attached or formed with the plate portion. The fan 68 is a radial fan which during rotation causes air to move outwardly in the radial direction. Because the fan 68 is positioned adjacent the vent openings 28 in the housing 12, air from within the housing can be expelled through the vent openings 28 to cool the attachment. In this regard, the planetary gear set 74 tends to generate sufficient heat that makes it desirable for the fan 68 to provide beneficial cooling. While not specifically shown, the pinion shaft 70 is configured with a recess in its left end as shown in FIG. 2 that cooperatively engages the square cross section coupling shaft 64 so that rotation of the coupling shaft 64 will rotate the shaft 70 as well as the fan 68. The pinion gear 72 engages components of the planetary gear set 74.

Figure 4:
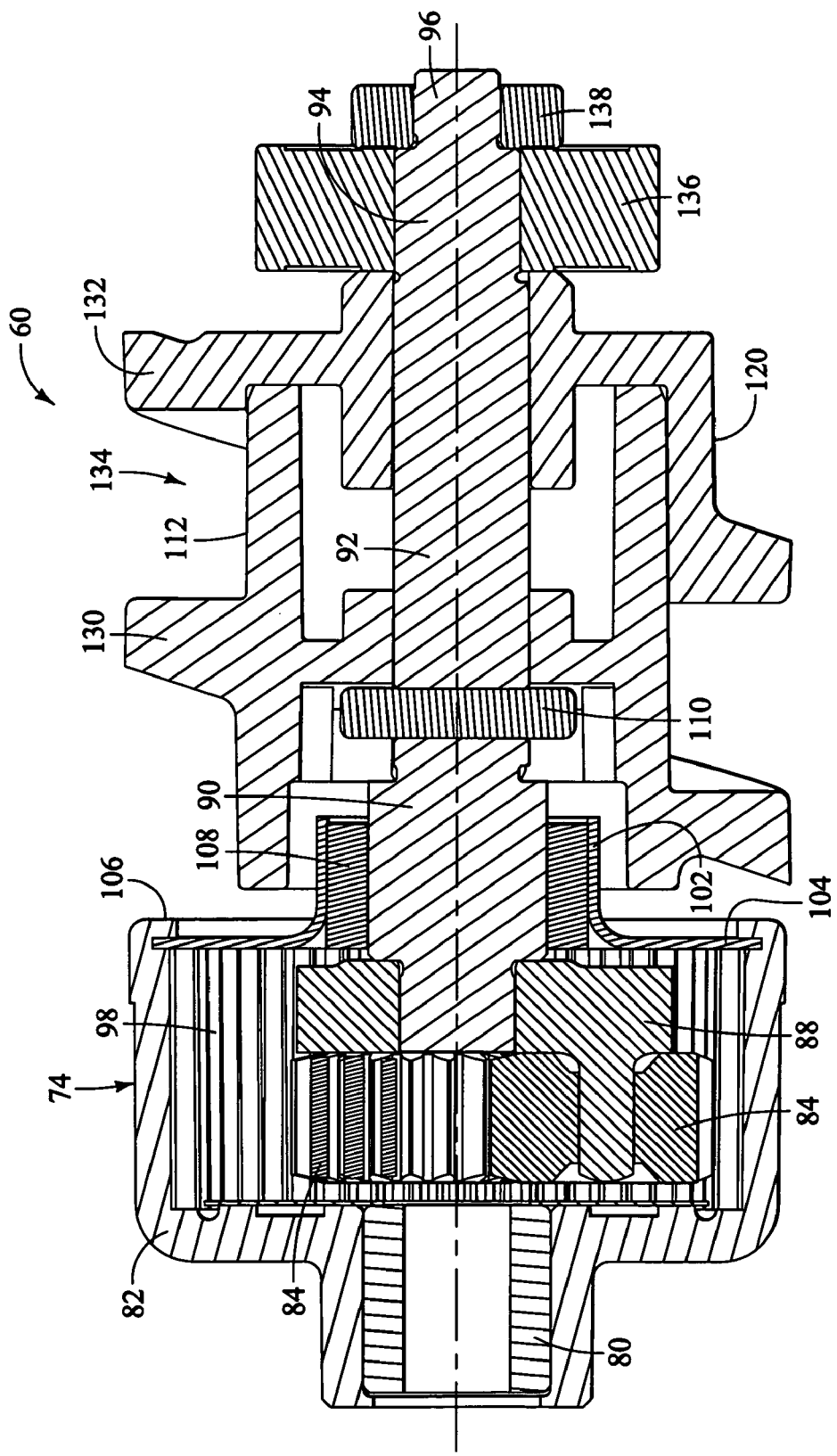
FIG. 4 is a side view of a portion of the drive train of the attachment shown in FIG. 1, and is shown partially in section.
Figure 5:
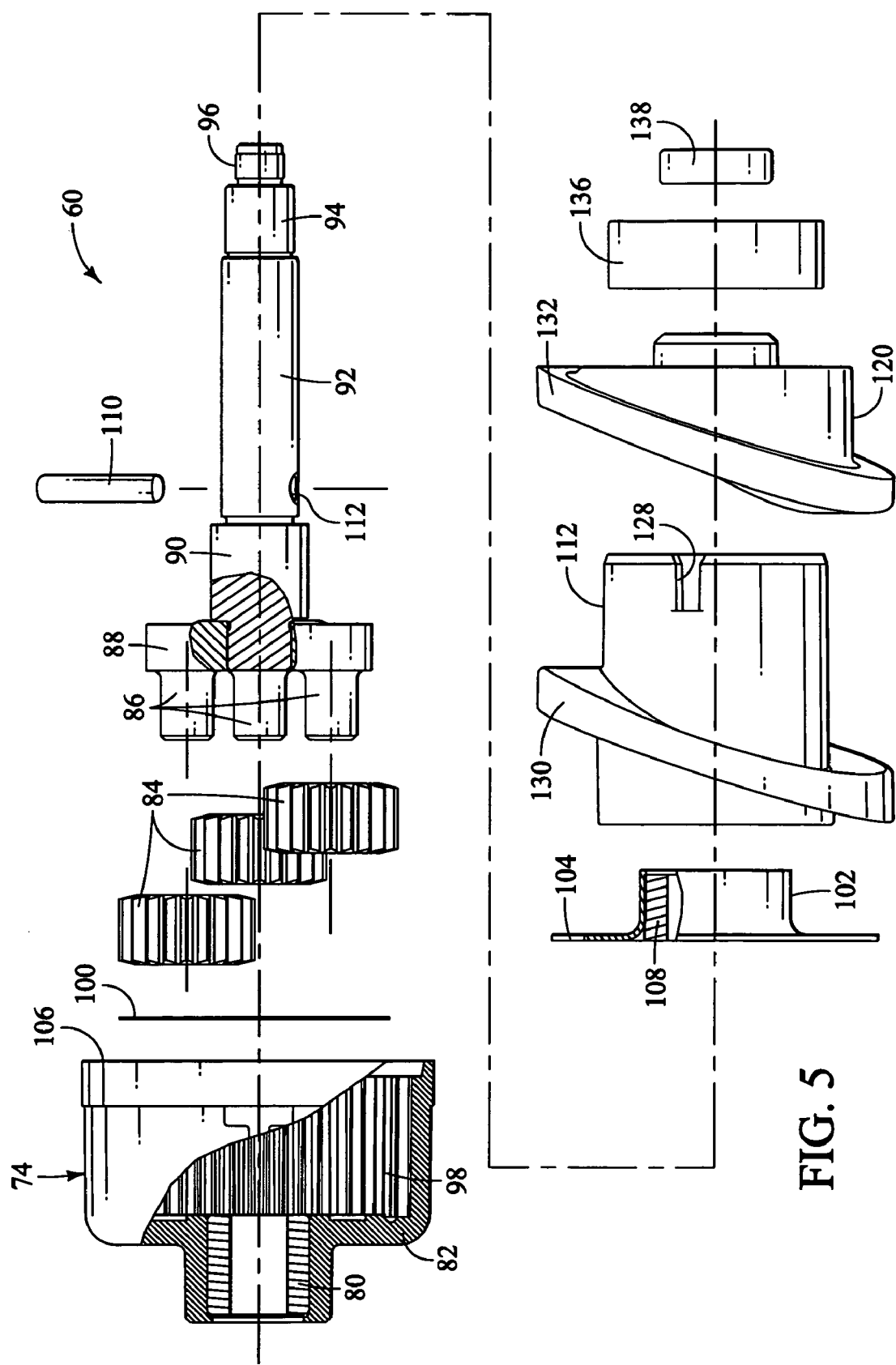
FIG. 5 is an exploded side view of the drive train shown in FIG. 4.

As is best shown in FIGS. 2, 4 and 5, the pinion shaft 70 fits within the planetary gear set 74 and particularly rides in a needle bearing 80 which is retained in an opening in a gear housing 82 of the planetary gear set 74. The needle bearing 80 is of the type which is well known in the art and is commercially readily available. It has a number of elongated cylindrical needles that rotate within an outer cylindrical raceway. The pinion shaft 70 is therefore supported in the needle bearing 80 and the pinion gear 72 is configured to engage each of three planet gears 84 that have concentric openings so that they fit on shafts 86 that are attached to a carrier plate 88 which in turn is attached to an output shaft 90 by a press fit or other known attachment configuration, with the shaft 90 having a reduced diameter portion 92, as well as additional reduced diameter portions 94 and 96. The gear housing 82 has a ring gear configuration 98 on the inner surface thereof which also engages each of the planet gears 84, it being understood that the shafts 86 and the ring gears 84 that are carried by the shafts are in a triangular arrangement relative to one another, i.e., the shafts are angularly displaced from one another by 120°.

When the planet gears 84 are mounted on the shafts 86 and the assembly is inserted into the gear housing 82, a flat circular shim plate 100 may be inserted, with the shim plate 100 having a central opening through which the pinion shaft 70 and gear 72 may pass so that the pinion gear 72 may engage the planet gears 84. With the illustrated configuration, the output shaft 90 of the planetary gear set 74 is reduced by a factor of 9 relative to the rotational speed of the pinion shaft 70. This therefore reduces the rotational speed of the output relative to the input, and also proportionately increases the torque that is produced by the hand tool.

Referring to FIGS. 4 and 5, the output shaft 90 has a bushing plate 102 that is cylindrically shaped and has an outer annular flange 104 which is sized to fit within the inside of the gear housing 82 which effectively encloses the gear set 74. Once assembled, the rim of the gear housing 82 is preferably crimped against the outer circumference of the annular flange 104 as shown at 106 in FIG. 4 to substantially seal the interior of the housing including the carrier plate 88 and gears 84 that are located within the gear housing 82. A bushing 108 is located within the bushing plate which is also held stationary relative to the rotating output shaft portion 90. It should be understood that the inside diameter of the bushing 108 is sized to receive the output shaft portion 90 and firmly hold the same while permitting rotation thereof relative to the bushing 108.

Figure 10:
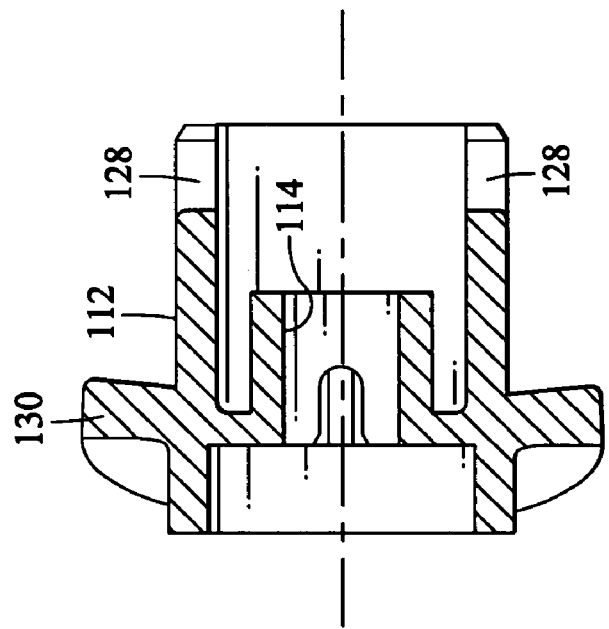
FIG. 10 is a cross-section taken along the line 10—10 of FIG. 9.
Figure 9:
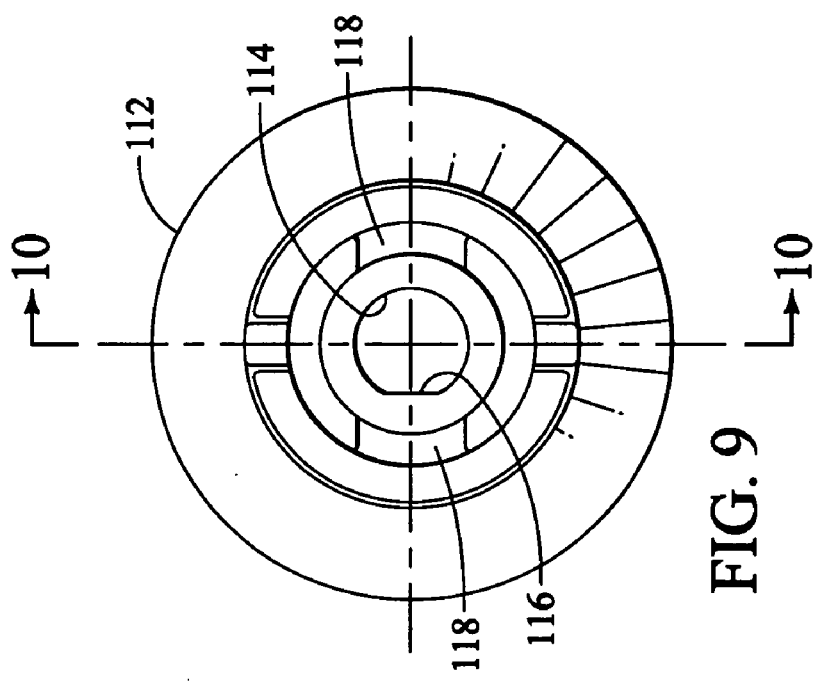
FIG. 9 is a front view of the rear cam section.

A dowel pin 110 fits within an opening 112 in the reduced diameter portion 92 of the output shaft 90 so that it extends in both directions from the shaft portion 92. It has a length sufficient to engage recesses 118 on a rear barrel cam section 112 which has an inside diameter that is sized to receive the output shaft portion 92 in close fitting engagement. The rear barrel cam section 112 is shown in FIGS. 9 and 10, with an inside diameter 114 having a flat portion 116 that corresponds with a flat portion of the output shaft section 92 that is not shown in detail. The corresponding flats orient the rear barrel cam section 112 in the proper angular position so that the outwardly protruding ends of the dowel pin 110 will engage the recesses 118 in the rear barrel cam section 112. The width of the recesses 118 are slightly larger than the diameter of the dowel pin 110 so that the dowel pin will fit within the recesses 118, but will also firmly hold the barrel cam section 112 from rotation relative to the shaft portion 92.

Figure 12:
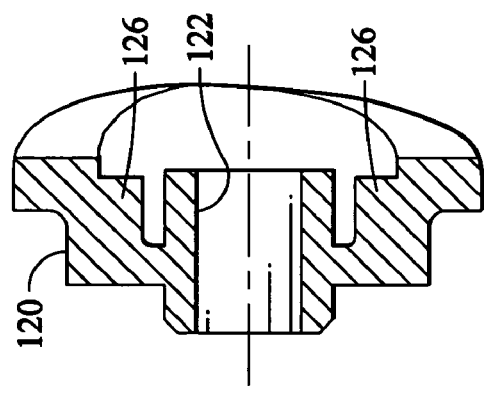
FIG. 12 is a cross-section taken generally along the line 12—12 of FIG. 11.
Figure 11:
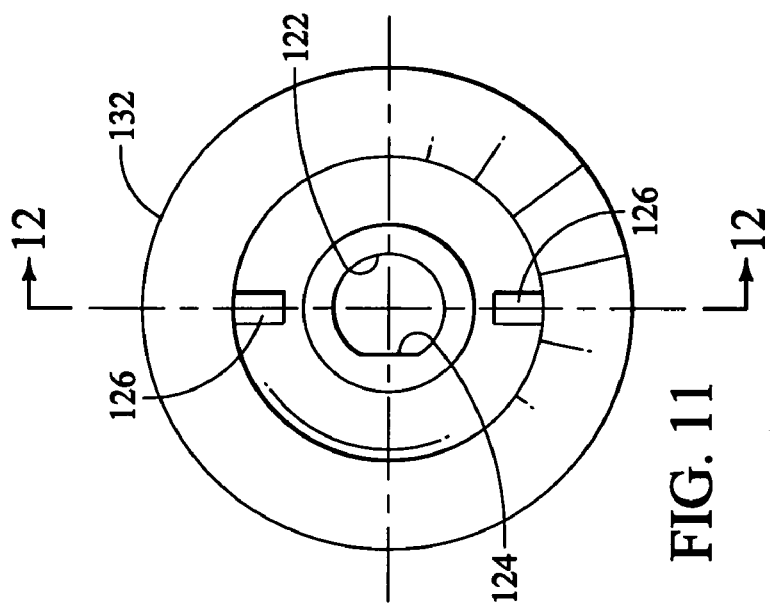
FIG. 11 is a front view of the front cam section of the drive train shown in FIG. 4.

A front barrel cam section 120 also fits on the shaft portion 92 immediately adjacent and in front of the rear section 112. The front barrel cam section 120 is shown in FIGS. 11 and 12 and it has an internal opening 122 with a flat portion 124 that is provided for the same purpose as described with regard to the rear barrel cam section 112. The front section 120 has a pair of keys 126 that fit within a pair of keyways 128, only one of which is visible in FIG. 5. Each of the barrel cam sections 112 and 120 has an outwardly extending flange 130, 132, which together with the outside diameter of barrel section 112 defines a cam groove that is indicated generally at 134 in the drawings. A ball bearing 136 appropriately sized to fit on the output shaft section 94 is supported by structural surfaces in the housing 12 so that the drive train is supported at both ends. A retaining ring 138 is friction fit on output shaft 96 and holds the components of the drive train together.

Figure 13:
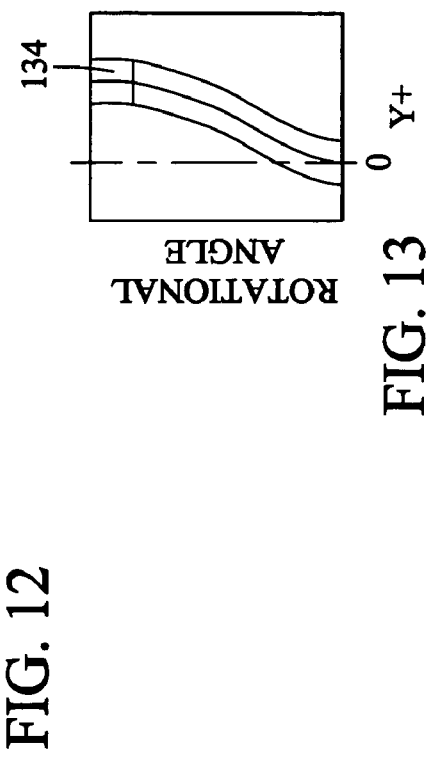
FIG. 13 is a chart illustrating a portion of the cam groove that is defined by the front and rear cam sections when they are interconnected.
Figure 14:
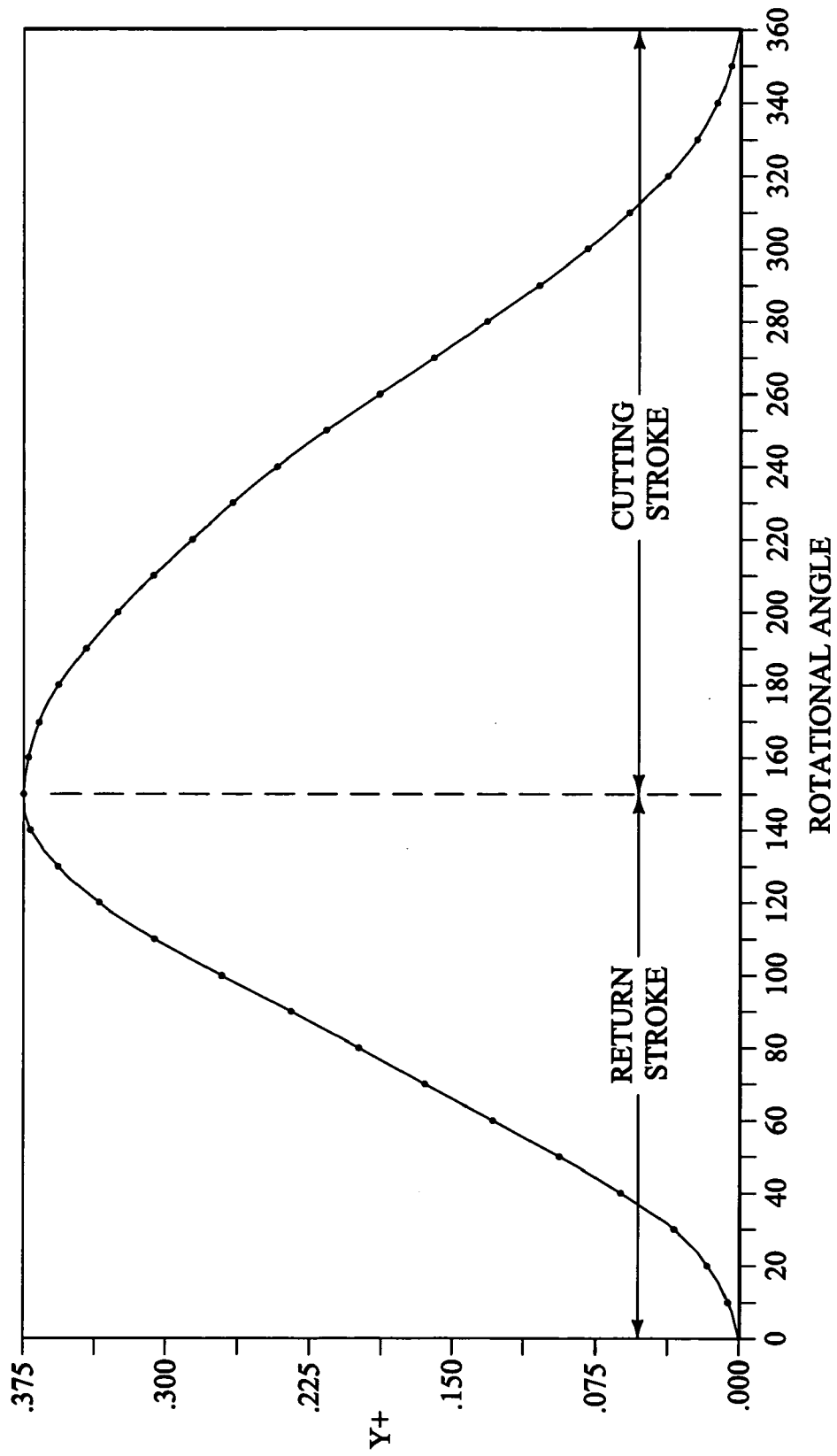
FIG. 14 is a chart illustrating the displacement Y of the cam follower during a full 360° rotation of a rotary drive train.

The cam groove 134 extends completely around the joined barrel sections and defines a generally sinusoidal or near sinusoidal path around the periphery. FIG. 13 illustrates a portion of the path, with the center of the path being shown and its extreme leftward position being marked as 0. As the barrel cam sections rotate, the cam path center line moves to the right as shown in FIG. 13 to its extreme right position and then returns to the zero position upon a full revolution of the barrel cam. A chart of the path in terms of movement from its extreme left or zero position through a full 360° rotation is shown in FIG. 14, with the amount of movement being 3.75" of travel in the Y direction. It should be understood that the cam groove could be configured to have a greater or lesser amount of movement in the Y direction than the 0.375" as shown, if desired. If not apparent from the foregoing description, the excursion in the Y direction is movement in the horizontal direction as oriented from FIGS. 1 and 3 which results in reciprocating movement of the blade 36 as shown in FIG. 3.

The cam follower assembly 62 is shown in FIGS. 3, 6, 7 and 8 and comprises an elongated plunger 140 that is slideable within a pair of supports 142 which extend transversely of the length of the plunger 140 and which have ends 144 that engage recesses 146 located in both housing sections 14 and 16, only those in section 114 being visible in FIG. 2. The supports 142 have a center portion that includes upper and lower sections that are sized to permit the plunger 140 to fit within them and be slideable in the left to right direction as shown in FIG. 6. The configuration is shown in perspective in FIG. 2 of the drawings. Generally mid-way between the supports 142 is a cam follower mechanism that comprises a cylindrical needle bearing 148 that fits on a cylindrical sleeve 150 that has an enlarged head portion 152. The sleeve 150 fits through an opening 154 in the plunger 140. A washer 156 and a thin bronze thrust washer 158 provide a surface on which the needle bearing 148 can ride. The outer diameter of the needle bearing 148 is only slightly smaller than the width of the cam groove 134 so that very little play exists between the two components.

As the barrel cam sections 130 and 132 rotate, the cam follower defined by the needle bearing 148 will move in the horizontal direction as shown in FIGS. 6 and 7 in a reciprocating manner as is desired. At the front or right end of the plunger 140 is an implement holder, indicated generally at 160, which is configured to receive a blade such as the saber saw blade 36 shown in FIG. 3. The holder has a generally box-like configuration with a lower slot 162 through which the right end of the plunger 140 (as shown in FIG. 7) can be inserted and a dowel pin 164 is force fit into openings in both the bottom part of the holder 160 and in the end portion of the plunger 140. Thus, the implement holder 160 is fly attached to the plunger as is desired.

The plunger also has an opening 166 in the front of the holder as shown in FIG. 8 which is configured to receive the shank end of the blade 36. An elongated pressure pad 168 is also located in the slot 166 and generally extends from the right to the left end of the block 160 as shown in FIG. 7. It also extends beyond the back end and has an enlarged portion 170 through which a pin 172 is force fit into an opening therein. The front end of the pressure pad 168 is preferably curved to facilitate insertion of a blade 36 into the slot 166. The blade 36 is secured by a set screw 174 threadably engaged in a threaded hole in the holder 160. When the set screw is tightened by an Allen wrench fitting into a recess 176, the inner end of the set screw will contact the pressure pad 168 forcing it against the shank of the blade 36 to firmly hold it in place. It should be understood that the set screw 174 is accessible through the housing 12 by the opening 34 as shown in FIG. 1. Also, while an Allen wrench configuration is shown, other configurations, such as a star configuration, square configuration, or even regular or Phillips screw configurations may be used.

Referring to the chart of FIG. 14, the cam groove is configured to define a generally sinusoidal path, but it should be apparent that the movement from the 0 or extreme left position as shown in FIG. 13 represents the end of the cutting stroke which occurs when the blade 36 is pulled from the right to the left as shown in FIG. 3. The return stroke occurs within 150° of rotation as shown in FIG. 14 and the cutting stroke occurs when the rotational angle moves from 150° through 360°.

While other near-sinusoidal paths may be used, the shape of the chart shown in FIG. 14 is defined by the following equations.

y is a function of the barrel rotation angle:
for 0° to 150°, y=4.7625

$$\left[1 + \cos\left[\frac{\pi}{180}\left(\frac{c \cdot 180}{150} + 180\right)\right]\right]$$

for 150° to 360°, y+4.7625

$$\left[1 + \cos\left[\frac{\pi}{180}\left(180 + \frac{180}{210}(360 - C)\right)\right]\right]$$

where C=position angle.

Since more work is being done during the cutting stroke, the efficiency of the sawing operation is increased by causing the cutting action to occur through a greater rotational angle and the return stroke occur through a lesser rotational angle. It has been found that while a truly symmetrical distribution of the cutting and return stroke, i.e., 180° for each, will operate reasonably well, increased efficiency has been experienced when the above described asymmetrical cutting and return stroke is used.

While the chart of FIG. 14 illustrates a 150° return stroke and a 210° cutting stroke, the return stroke may be increased to extend over a larger angle if desired. However, using a larger angle return stroke will result in a reduction in operating efficiency compared to the smaller 150° return stroke. It should be understood that the lower the angle of the return stroke, the greater the stresses that are applied to the barrel cam structure. Since it is desired to make the barrel cam sections from glass filled nylon, it has been found that about 150° is the lower limit for the configuration illustrated in the drawings when the barrel cam sections are made of this material. Having a return stroke of about 150° results in acceptable stresses being applied to the barrel cam sections that will not damage them and also results in desirable operating efficiency.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A rotary to reciprocating motion conversion attachment for a power rotary hand tool of the type which has a tool housing with a nose portion and an associated rotatable output shaft, said attachment comprising:
   a housing having a mounting end portion configured to be attached to the hand tool;
   a rotary drive train located within said housing configured to be operatively connected to the output shaft of the hand tool, said drive train having and driving a generally rotatable cylindrical barrel cam, said barrel cam having a cam groove formed in and extending around the outside of the barrel cam, the configuration of the cam groove defining a generally sinusoidal path around the circumference thereof, said path beginning at a first end point and reaching a second end point during less than 180 degrees of rotation and returning to said first end point for the remainder of 360 degrees of rotation, said rotary drive train comprising a planetary gear set adjacent said mounting end portion, said gear set having an input shaft and an output shaft, said output shaft being operatively connected to said barrel cam so that they rotate together;
   a cam follower assembly located in said housing and having a frame slideable along a frame support in a direction generally parallel to said cam axis, said assembly having a cam follower for engaging said cam groove and moving said frame in a reciprocating manner as said barrel cam is rotated;
   said cam follower assembly having an implement holder attached to said frame for holding an implement.

2. An attachment as defined in claim 1 wherein said barrel cam rotates around an axis oriented generally parallel to the hand tool output shaft.

3. An attachment as defined in claim 1 wherein said cam groove configuration produces a different amount of acceleration and deceleration of said frame in moving from said first end point to said second end point relative to the acceleration and deceleration in moving from said second end point to said first end point.

4. An attachment as defined in claim 1 wherein said housing comprises at least two complementary sections that fit together.

5. An attachment as defined in claim 1 wherein said housing has an attachment sleeve assembly with interior threads configured to engage exterior threads of the nose portion of the tool housing of the power rotary hand tool.

6. An attachment as defined in claim 1 wherein said housing has at least one vent opening adjacent said mounting end portion and said rotary drive train has a fan blade adjacent said vent opening for moving air from the interior of said housing through said vent opening.

7. An attachment as defined in claim 1 wherein said output shaft is connected to a carrier plate which carries a plurality of planet gears, said input shaft being connected to a pinion gear that meshes with said planet gears, said gear set having a ring gear meshing with said planet gears, the speed of rotation of said output shaft being reduced relative to the speed of rotation of said input shaft.

8. An attachment as defined in claim 7 wherein the speed of rotation of said output shaft is one ninth the speed of rotation of said input shaft.

9. An attachment as defined in claim 7 wherein said input shaft has a non-circular recess for receiving a complementary non-circular drive coupling shaft for operatively connecting said input shaft with the output shaft of the rotary hand tool such that the hand tool output shaft can drive said drive coupling shaft and said input shaft of said accessory.

10. An attachment as defined in claim 9 wherein said noncircular recess is a multiple sided recess.

11. An attachment as defined in claim 9 wherein said drive coupling shaft has a generally square shaped cross section and said noncircular recess is configured to receive said drive coupling shaft.

12. An attachment as defined in claim 1 wherein said frame comprises an elongated generally flat member supported at opposite end portions by said frame supports which permit said flat member to slide relative to said supports, each said frame support being oriented transversely of the length of said flat member and having an opening through which said flat member extends, said frame supports being secured in said housing, said cam follower being mounted to said frame member generally in the center thereof.

13. An attachment as defined in claim 1 wherein said cam follower comprises a generally cylindrical bearing rotatably mounted on a cylindrical stud secured to said frame member, the outer diameter of said bearing being slightly less than the width of said cam groove.

14. An attachment as defined in claim 13 wherein said cylindrical bearing is a needle bearing.

15. An attachment as defined in claim 1 wherein the angular range of said path from said first end point to said second end point is within the range of approximately 150 to less than 180 degrees of rotation.

16. A rotary to reciprocating motion conversion attachment for a power rotary hand tool of the type which has a tool housing with a nose portion and an associated rotatable output shaft, said attachment comprising:
   a housing having a mounting end portion configured to be attached to the hand tool;
   a rotary drive train located within said housing configured to be operatively connected to the output shaft of the hand tool, said drive train having and driving a generally rotatable cylindrical barrel cam, said barrel cam having a cam groove formed in and extending around the outside of the barrel cam, the configuration of the cam groove defining a generally sinusoidal path around the circumference thereof, said path beginning at a first end point and reaching a second end point during less than 180 degrees of rotation and returning to said first end point for the remainder of 360 degrees of rotation;
   a cam follower assembly located in said housing and having a frame slideable along a frame support in a direction generally parallel to said cam axis, said assembly having a cam follower for engaging said cam groove and moving said frame in a reciprocating manner as said barrel cam is rotated;

said cam follower assembly having an implement holder attached to said frame for holding an implement, wherein said holder is secured to the end of said frame member opposite said mounting end portion, said holder having a slot into which an implement can be inserted, said holder having a set screw for securing an implement in said slot; said holder comprising an elongated pressure pad located in said slot, said pad being positioned between said implement and said set screw, said pad dispersing the set screw force along a larger portion of said implement.

17. A rotary to reciprocating motion conversion attachment for a power rotary hand tool of the type which has a tool housing with a nose portion and an associated rotatable output shaft, said attachment comprising:
   a housing having a mounting end portion configured to be attached to the hand tool;
   a rotary drive train located within said housing configured to be operatively connected to the output shaft of the hand tool, said drive train having and driving a generally rotatable cylindrical barrel cam, said barrel cam having a cam groove formed in and extending around the outside of the barrel cam, the configuration of the cam groove defining a generally sinusoidal path around the circumference thereof, said path beginning at a first end point and reaching a second end point during less than 180 degrees of rotation and returning to said first end point for the remainder of 360 degrees of rotation;
   a cam follower assembly located in said housing and having a frame slideable along a frame support in a direction generally parallel to said cam axis, said assembly having a cam follower for engaging said cam groove and moving said frame in a reciprocating manner as said barrel cam is rotated;
   said cam follower assembly having an implement holder attached to said frame for holding an implement;
   wherein said barrel cam comprises two cam sections, each having a circumferential flange, said sections being connectable in non-rotational engagement, the distance between the opposing surfaces of said circumferential flanges defining said cam groove, one of said cam sections having at least one keyway and the other having at least one key that engages one of said keyway to preclude said cam sections from rotating relative to one another.

18. A rotary to reciprocating motion conversion attachment for a high speed rotary power hand tool of the type which has a tool housing with a nose portion and an associated rotatable output shaft, said attachment comprising:
   a housing having a mounting end portion configured to be attached to the hand tool;
   a rotary drive train located within said housing configured to be operatively connected to the output shaft of the hand tool, said drive train having a rotary speed reduction gear set, the output of which drives a generally cylindrical barrel cam rotatable around an axis oriented generally parallel to the hand tool output shaft, said barrel cam having a cam groove formed in and extending around the outside of the barrel cam, the configuration of the cam groove defining a generally sinusoidal path around the circumference thereof, said path beginning at a first end point and reaching a second end point during approximately 150 to 180 degrees of rotation and returning to said first end point for the remainder of 360 degrees of rotation;
   a cam follower assembly located in said housing and having a frame slideable along a frame support in a direction generally parallel to said cam axis, said assembly having a cam follower for engaging said cam groove and moving said frame in a reciprocating manner as said barrel cam is rotated;
   said cam follower assembly having an implement holder attached to said frame for holding an implement, wherein said holder is secured to the end of said frame member opposite said mounting end portion, said holder having a slot into which an implement can be inserted, and a set screw for securing an implement in said slot, said holder further comprising an elongated pressure pad located in said slot, said pad being positioned between said implement and said set screw, said pad dispersing the set screw force along a larger portion of said implement;
   said cam groove configuration causing said implement to move slower during a cutting stroke and move faster during a return stroke, thereby tending to optimize the operation of said implement.

19. A rotary to reciprocating motion conversion attachment for a high speed rotary power hand tool of the type which has a tool housing with a nose portion and an associated rotatable output shaft, said attachment comprising:
   a housing having a mounting end portion configured to be attached to the hand tool;
   a cam follower assembly having an implement holder for holding an implement, said cam follower assembly being configured to reciprocate along a generally straight path defining a cutting stroke and a return stroke;
   a rotary drive train located within said housing configured to be operatively connected to the output shaft of the hand tool, said drive train driving a generally cylindrical rotatable barrel cam having a cam groove formed in and extending around the outside of the barrel cam, said cam groove being configured to cause said implement to move slower during said cutting stroke and move faster during said return stroke, thereby tending to optimize the operation of said implement, said rotary drive train comprising a planetary gear set adjacent said mounting end portion, said gear set having an input shaft and an output shaft, said output shaft being operatively connected to said barrel cam so that they rotate together.

* * * * *

UNITED STATES PATENT AND TRADEMARK OFFICE
CERTIFICATE OF CORRECTION

PATENT NO. : 7,134,508 B2 Page 1 of 1
APPLICATION NO. : 10/844467
DATED : November 14, 2006
INVENTOR(S) : Edward T. Prell It is certified that error appears in the above-identified patent and that said Letters Patent is hereby corrected as shown below:

Column 6, line 1, delete "fly" and insert --firmly--.

Signed and Sealed this

Thirteenth Day of March, 2007

JON W. DUDAS
*Director of the United States Patent and Trademark Office*